(12) United States Patent
Liao et al.

(10) Patent No.: US 6,912,038 B2
(45) Date of Patent: Jun. 28, 2005

(54) METHOD FOR MANUFACTURING LIQUID CRYSTAL DISPLAY

(75) Inventors: Chi-Chang Liao, Hsinchu (TW); Ing-Jer Lin, Hsinchu (TW); Yi-Chun Wong, Hsinchu (TW); Chia-Rong Sheu, Hsinchu (TW); Lung-Pin Hsin, Hsinchu (TW); Kang--Hung Liu, Hsinchu (TW); Ching-Hsiang Chan, Hsinchu (TW); Yi-An Sha, Hsinchu (TW); Shin-Mao Huang, Hsinchu (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 66 days.

(21) Appl. No.: 10/673,269

(22) Filed: Sep. 30, 2003

(65) Prior Publication Data

US 2005/0018124 A1 Jan. 27, 2005

(30) Foreign Application Priority Data

Jul. 24, 2003 (TW) ........................................ 92120284 A

(51) Int. Cl.⁷ ............................................. G02F 1/1333
(52) U.S. Cl. ........................ 349/187; 349/156; 349/86; 349/158
(58) Field of Search ................................. 349/158, 187, 349/156, 86

(56) References Cited

U.S. PATENT DOCUMENTS 5,576,856 A * 11/1996 Kawazu et al. ............... 349/89
6,274,412 B1 * 8/2001 Kydd et al. .................. 438/149
6,784,953 B2 * 8/2004 Liang et al. ................... 349/86
2003/0137620 A1 * 7/2003 Wang et al. .................. 349/95
2004/0160300 A1 * 8/2004 Shrier .......................... 337/16

* cited by examiner

Primary Examiner—Kenneth Parker
Assistant Examiner—(Nancy) Thanh-Nhan P. Nguyen
(74) Attorney, Agent, or Firm—Bacon & Thomas PLLC

(57) ABSTRACT

The present invention discloses a method for manufacturing liquid crystal display (LCD) device by utilizing photopolymer. A first photopolymer layer is coated on the support substrate and the substrate having a buffer layer is treated by photopolymerization. A substrate is treated by processes for forming an electrode layer, an alignment layer and projections as required by general LCD manufacturing. A second photopolymer layer is coated on the substrate having a plurality electrode patterns, an alignment layer and projections. Mask exposure is applied to the substrate and the photopolymer forms a polymer wall. Alternatively molding can be applied to the substrate along with linear ultra violet exposure. The photopolymer layer is hardened by such process and forms a polymer wall with alignment. The cavities in the polymer wall are filled with mixture of liquid crystal and small amount of photopolymer. The support substrate and the substrate are aligned and treated by mask exposure for coupling the support substrate to the substrate via photopolymerization. The support substrate is separated from the substrate and accordingly a single substrate LCD device is generated. The same method can be applied to manufacturing process for a LCD device without a substrate. The method increases yield rate also provides a different method for manufacturing a LCD device.

33 Claims, 19 Drawing Sheets

METHOD FOR MANUFACTURING LIQUID CRYSTAL DISPLAY

FIELD OF THE INVENTION

A method for manufacturing liquid crystal display device featured with reduced thickness and weight of the device. In particularly, the present invention relates to a method for manufacturing liquid crystal display device applicable to a flexible plastic substrate, which has increased yields and diversified display modes.

BACKGROUND OF THE INVENTION

Reduced weight and volume is a main focus in the development of flat panel display technology. Effort is made to device a new flat panel display, which is light, compact, shock resistant and low power consumption in the flat panel display industry. For realizing such a flat panel display, which is light, slim and shock resistant, research focus of flat panel display technology has shifted from prior art glass substrate based process into plastic substrate based process. A patent application filed to WIPO No. WO02/42832A2 by KONINKL PHILIPS ELECTRONICS NV comprises technology based on the new plastic substrate display manufacturing process, wherein the technology involves with wrapping liquid crystal with polymeric material on the substrate. Steps of the process comprised in the patent application are shown in FIG. 1A to FIG. 1E. Firstly, in FIG. 1A, a layer of photopolymer material mixture 2 is coated on a substrate 1. The photopolymer material mixture 2 is composed of NOA 65 and liquid crystal materials. In FIG. 1B, a blade 3 is utilized for leveling the photopolymer material mixture 2. In FIG. 1C, the photopolymer material mixture 2 is positioned under a mask 4, and exposed under ultra violate 5 for an exposure process step. The area of the photopolymer material mixture 2 exposed under the ultra violate 5 is hardened and forms a plurality of polymer wall columns 20 as shown in FIG. 1D. A second exposure process step is performed as showed in FIG. 1E. However, the strength of the ultra violate 6 is weaker and exposure time is longer than the first exposure. The second exposure forms a thin hardened layer 21 on the surface of the photopolymer material mixture 2. Then the process moves to the step of completing phase separation between liquid crystal and the photopolymer material.

The patent application filed by KONINKL PHILIPS ELECTRONICS NV requires two exposures for forming a polymer structure wrapping liquid crystal in the manufacturing process. In addition, the second exposure involves with a step using low energy and long process time, which may cause deterioration of liquid crystal. Also, the manufacturing window is small, the yield rate is slow, and the display modes applicable are limited. Further more, in the patent application No. WO02/42832A2 by KONINKL PHILIPS ELECTRONICS NV, the method used in forming polymer walls adapts a phase separation technique, which leads to a increased amount of polymer and interfere with the quality of liquid crystal formation. The present invention utilizes a mask exposure or molding method for forming polymer wall. Such technique involves with reduced amount of polymer used also results in increased quality of liquid crystal formation.

For resolve the aforementioned problems, a method for manufacturing liquid crystal display device is provided in the present invention, which offers increased yield rate and display modes.

SUMMARY OF THE INVENTION

A method for manufacturing liquid crystal display device is disclosed in the present invention. The main features are described in the following. A first photopolymer layer is coated on the support substrate and a substrate having a buffer layer is treated by photopolymerization. A substrate is treated by processes for forming a conducting layer, an alignment layer and projections as required by general LCD manufacturing. A second photopolymer layer is coated on the substrate having a plurality of pixel electrodes, an alignment layer, and projections as required by general LCD manufacturing. Mask exposure is applied to the substrate and the photopolymer forms a polymer wall. Alternatively molding can be applied to the substrate along with linear ultra violet exposure. The photopolymer layer is hardened by such process and forms a polymer wall with alignment. The cavities in the polymer wall are filled with mixture of liquid crystal and small amount of photopolymer. The support substrate and the substrate are aligned and treated by mask exposure for coupling the support substrate to the substrate via photopolymerization. The support substrate is separated from the substrate and accordingly a single substrate LCD device is generated. The same method can be applied to manufacturing process for a LCD device without a substrate. The method increases yield rate also provides a different method for manufacturing a LCD device.

The invention can be more fully understood by reading the following detailed description of the preferred embodiments, with reference made to the accompanying drawings.

DETAILED DESCRIPTION OF THE PREFERRED EMBODIMENTS

A method for manufacturing liquid crystal display device is disclosed in the present invention. The present invention improves manufacturing process in prior art and provides alternatives for manufacturing liquid crystal display. Further, the present invention is applicable to manufacturing liquid crystal display without a substrate. By utilizing the manufacturing process, the purposes of increasing yield rate also providing a different method for manufacturing a LCD device are realized. Preferred embodiments of the present invention will be explained with reference to accompanying drawings.

Figure 1A:
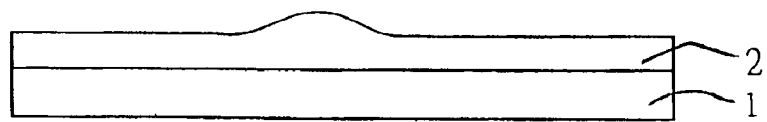
FIG. 1A to 1E are schematic diagrams illustrating manufacturing process of a single substrate liquid crystal display device in the prior art.
Figure 1B:
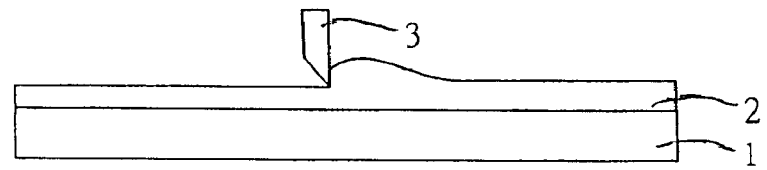
Figure 1C:
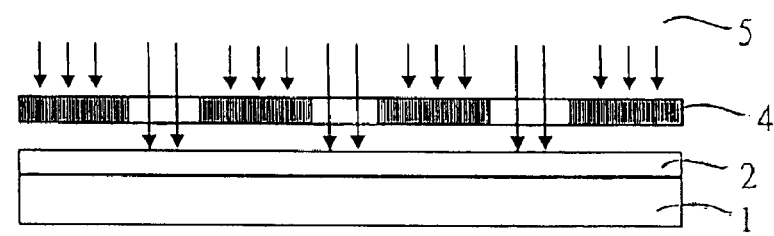
Figure 1D:
Figure 1E:
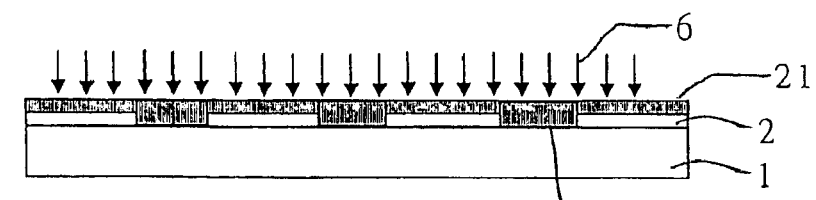
Figure 2A:
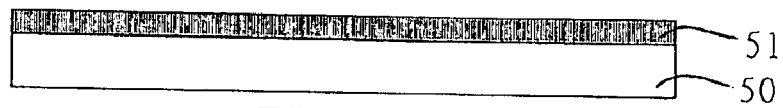
FIG. 2A to FIG. 2N are schematic diagrams illustrating manufacturing process of a single substrate liquid crystal display device in the first embodiment according to the present invention.
Figure 2B:
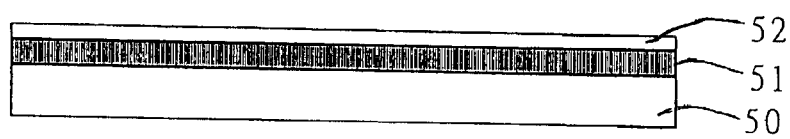
Figure 2C:
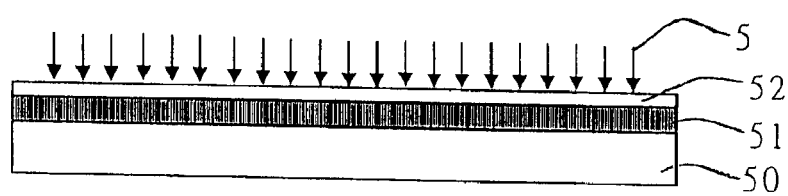
Figure 2D:
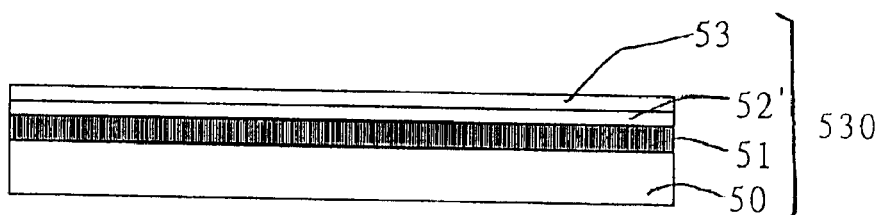
Figure 2E:
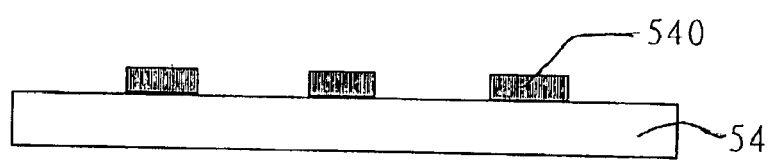
Figure 2F:
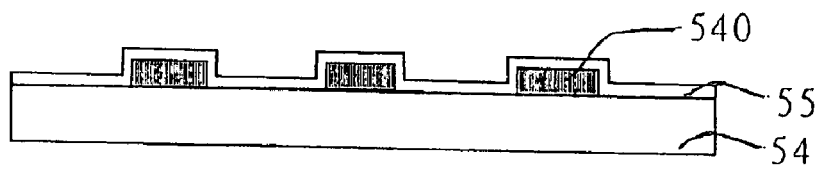
Figure 2G:
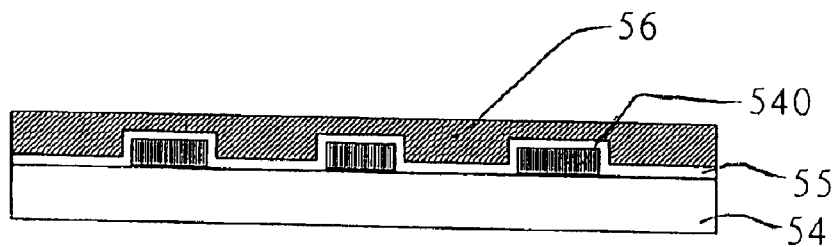
Figure 2H:
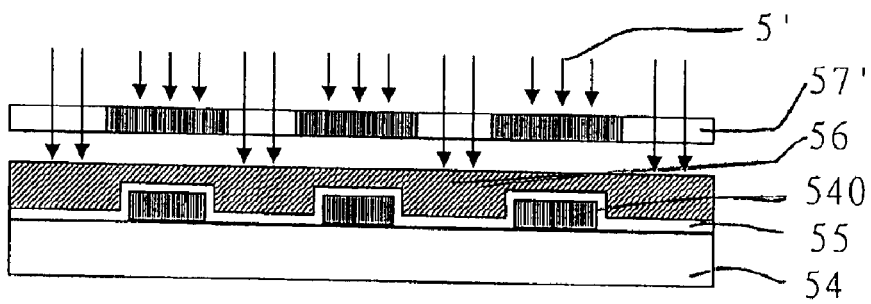
Figure 2I:
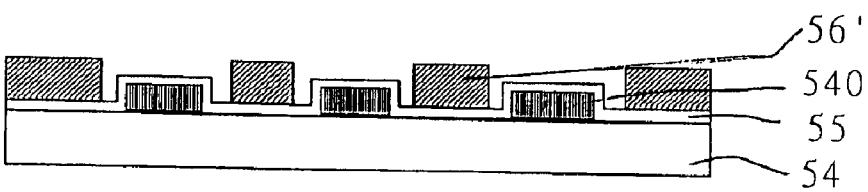
Figure 2J:
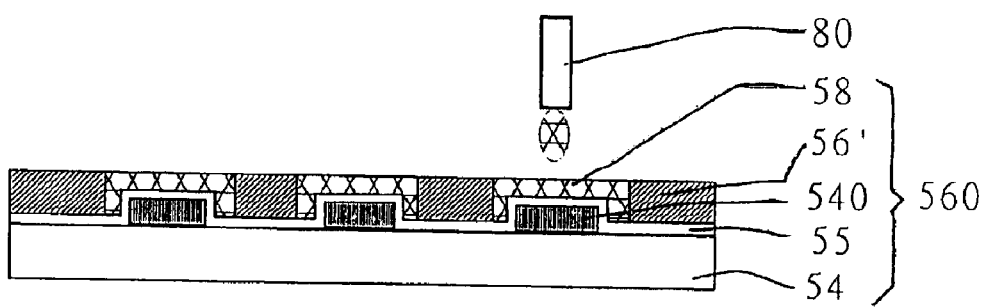
Figure 2K:
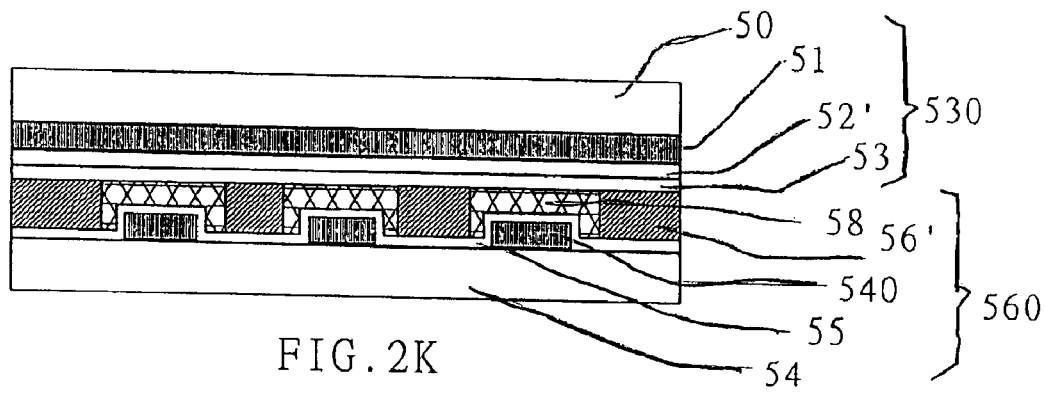
Figure 2L:
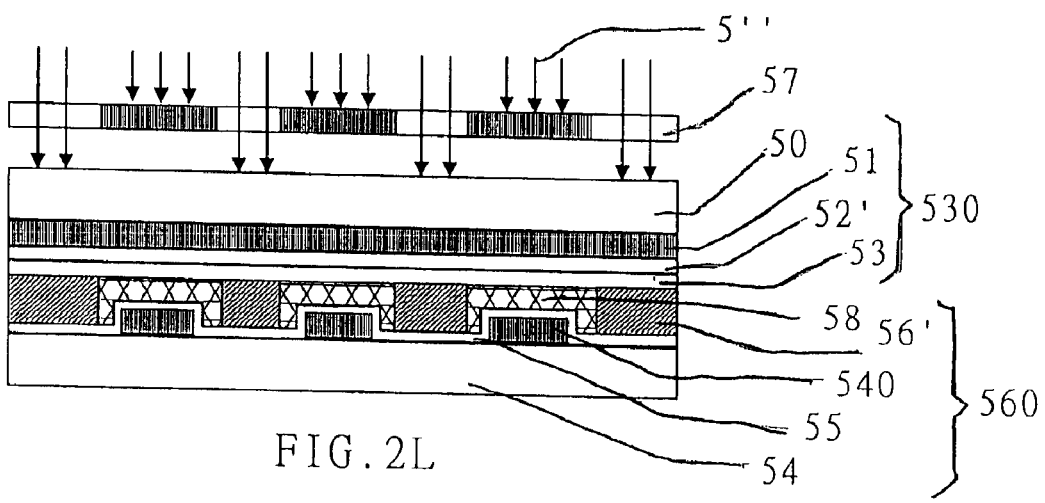
Figure 2M:
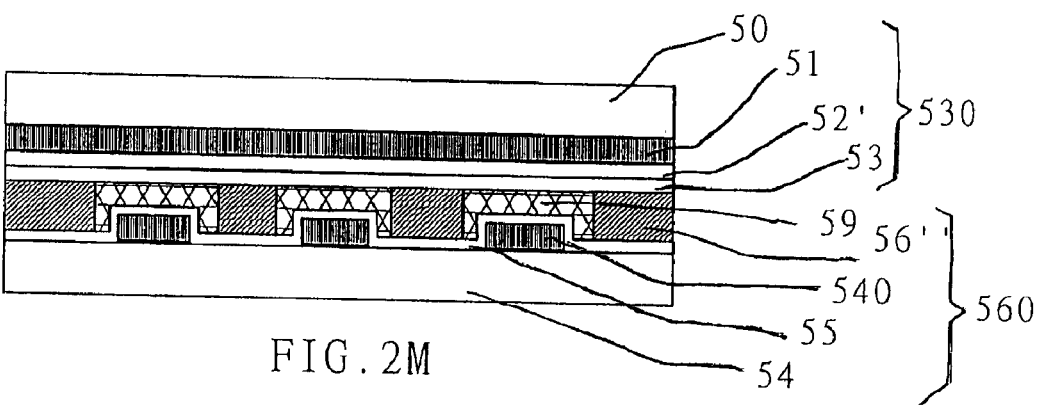
Figure 2N:
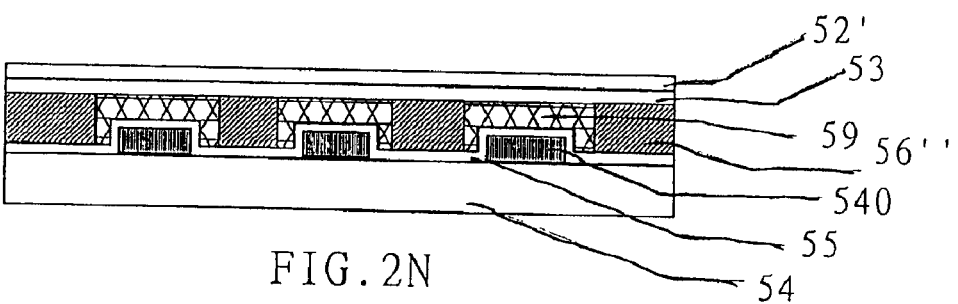

FIG. 2A to FIG. 2N are schematic diagrams illustrating manufacturing process of a single substrate liquid crystal display device in the first embodiment according to the present invention. The manufacturing process comprises steps described as follows.

FIG. 2A to FIG. 2D illustrate process steps for forming a first substrate. In FIG. 2A, a buffer layer 51 is formed on a support substrate 50. In FIG. 2B, a photopolymer material layer 52 (such as photopolymer material NOA 65 or NOA 72) is coated on the buffer layer 51. In FIG. 2C, the photopolymer material layer 52 is exposed under ultra violate 5 and hardened to form a photopolymer material layer 52'. In FIG. 2D, an alignment layer 53 is coated on the photopolymer material layer 52' to form a first substrate 530.

FIG. 2E to FIG. 2J illustrate process steps for forming a second substrate. In FIG. 2E, electrode pattern 540 is formed on a substrate 54. In FIG. 2F, an alignment layer 55 is coated on the substrate 54 and the electrode pattern 540. In FIG. 2G, a photopolymer material layer 56 is coated on the alignment layer 55. In FIG. 2H, an exposure process step is performed by a mask 57' radiating ultra violate 5'. In FIG. 2I, the photopolymer material layer 56 is hardened after mask exposure step and forms a polymer wall 56'. In FIG. 2J, cavities generated between the alignment layer 55 and the polymer wall 56' are filled with mixture 58 of liquid crystal and small amount of photopolymer by a dipping device 80. Accordingly, the second substrate 560 is formed.

FIG. 2K to FIG. 2N illustrate process steps for coupling the first substrate 530 and the second substrate 560. In the FIG. 2K, the first substrate 530 is position reversely on top of the second substrate 560. In FIG. 2K, the first substrate 530 is exposed under the mask 57 radiating ultra violate 5". In FIG. 2M, phase separation occurs between the photopolymer material and the liquid crystal in the mixture 58, and results in coupling of first substrate 530 and the second substrate 560. The polymer wall 56" is formed from the polymer wall 56' which can be used to couple with the upper substrate. At the same time, liquid crystal is separated from the photopolymer material, and the liquid crystal material 59 is wrapped by the polymer. In FIG. 2N, the support substrate 50 and the buffer layer 51 are detached from the first substrate 530 and a single substrate liquid crystal display device is formed.

As the embodiment shown in the FIG. 2A to FIG. 2N, the first embodiment of the present invention forms a polymer wall 56" by solidifying photopolymer material with mask exposure. Such method does not reduce doping of polymer, also effectively increase the quality of liquid crystal formation and yield rate.

Figure 3A:
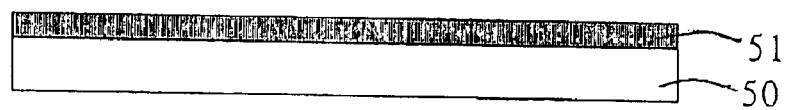
FIG. 3A to FIG. 3N are schematic diagrams illustrating manufacturing process of a single substrate liquid crystal display device in the second embodiment according to the present invention.
Figure 3B:
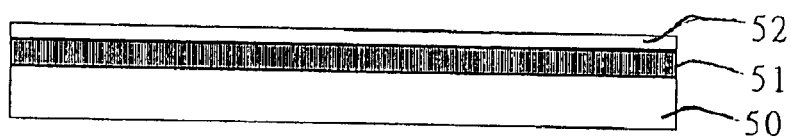
Figure 3C:
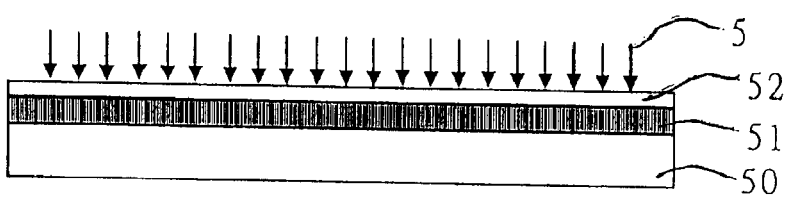
Figure 3D:
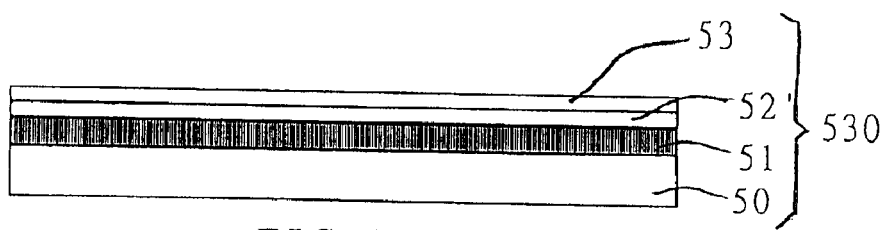
Figure 3E:
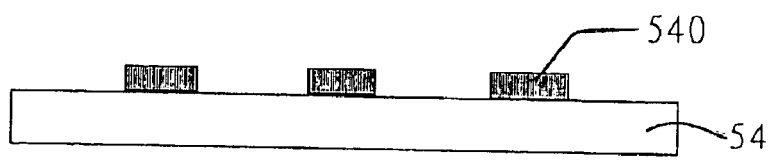
Figure 3F:
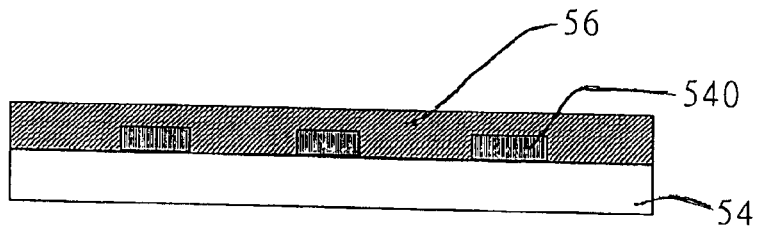
Figure 3G:
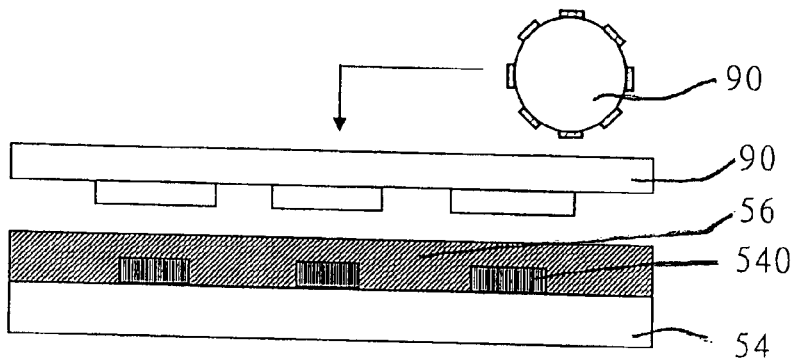
Figure 3H:
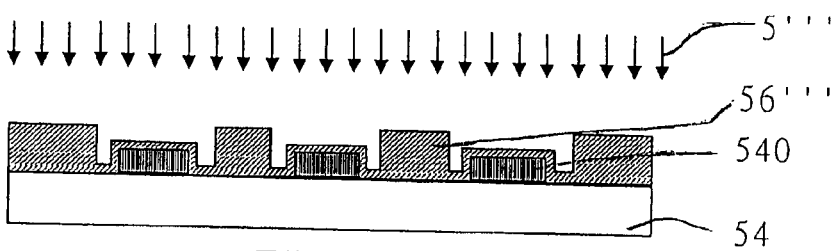
Figure 3I:
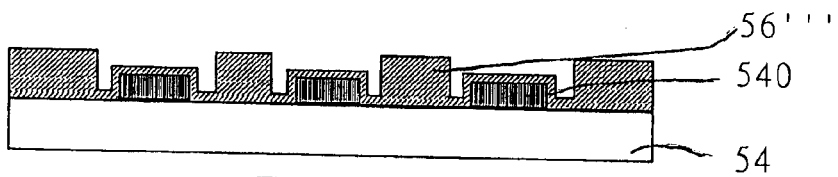
Figure 3J:
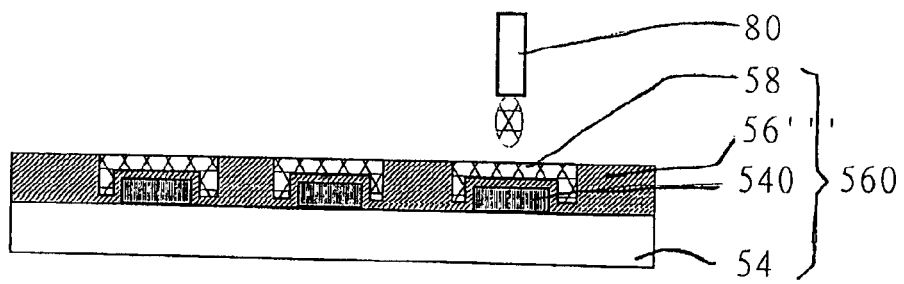
Figure 3K:
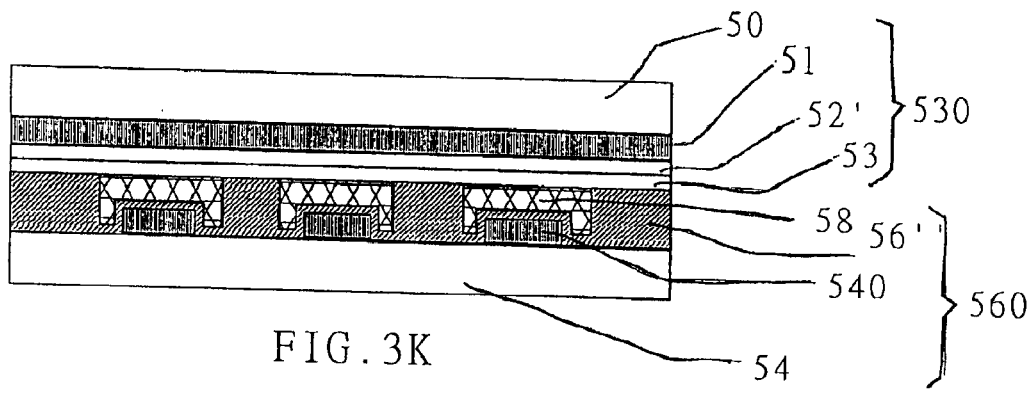
Figure 3L:
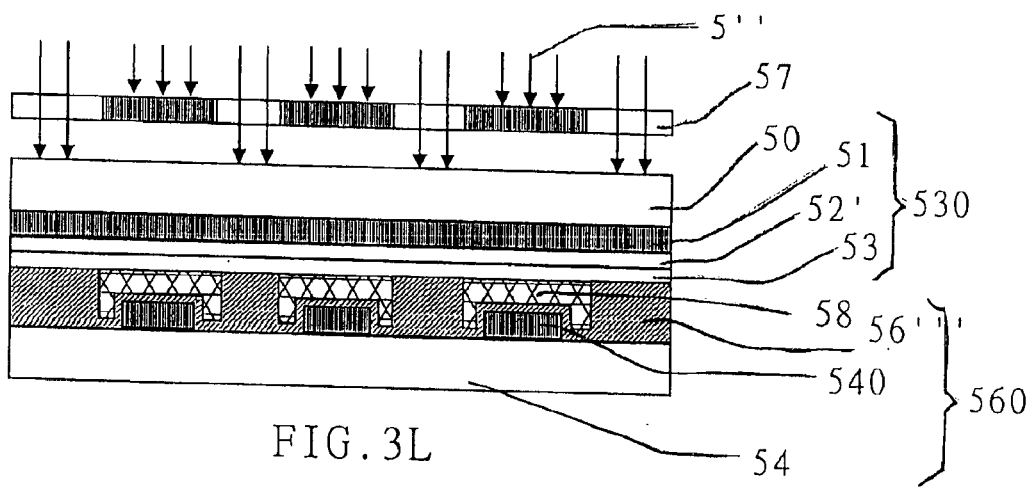
Figure 3M:
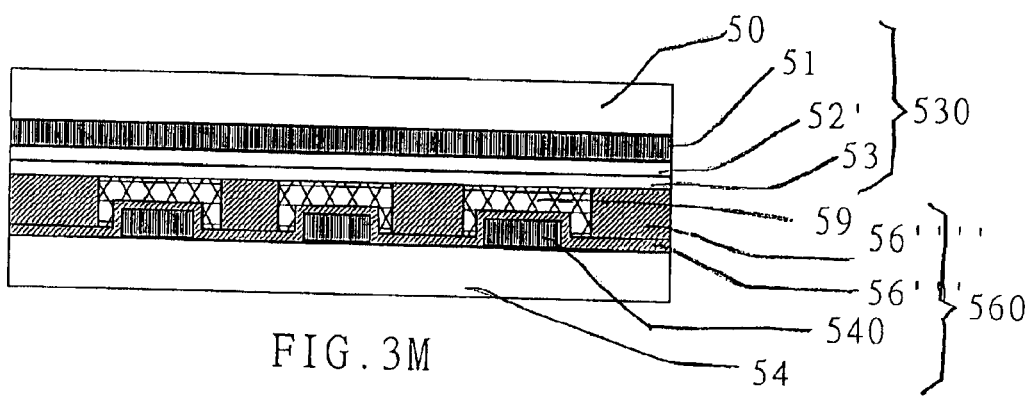
Figure 3N:
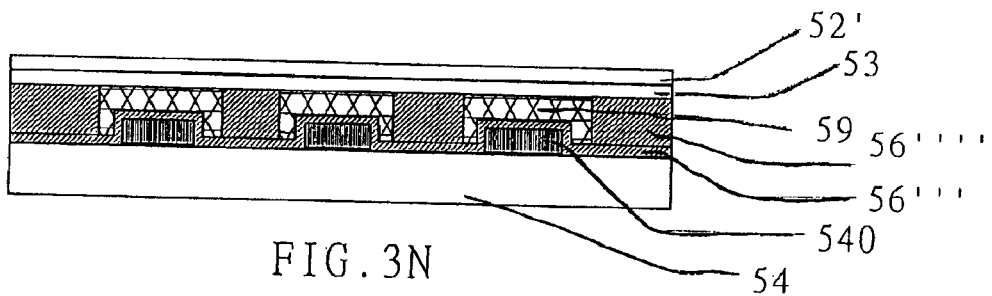

FIG. 3A to FIG. 3N are schematic diagrams illustrating manufacturing process of a liquid crystal display device in the second embodiment according to the present invention. The process steps of the second embodiment are largely identical with the steps of the first embodiment. The major difference lies in that the second embodiment utilizes molding along with ultra violate exposure for solidifying the polymer and forming a polymer wall with alignment on the second substrate. Polymer doping is effectively prevented by such method. The manufacturing process comprises steps described as follows.

FIG. 3A to FIG. 3D illustrate process steps for forming a first substrate 530. In FIG. 3A, a buffer layer 51 is formed on a support substrate 50. In FIG. 3B, a photopolymer material layer 52 (such as photopolymer material NOA 65 or NOA 72) is coated on the buffer layer 51. In FIG. 3C, the photopolymer material layer 52 is exposed under ultra violate 5 and hardened to form a photopolymer material layer 52'. In FIG. 3D, an alignment layer 53 is coated on the photopolymer material layer 52' to form a first substrate 530.

FIG. 3E to FIG. 3J illustrate process steps for forming a second substrate 560. In FIG. 3E, electrode pattern 540 is formed on a substrate 54. In FIG. 3F, a photopolymer material layer 56 is coated on the substrate 54 and the electrode pattern 540. In FIG. 3G, the polymer wall is shaped by molding the photopolymer material 56. In FIG. 3H, linear ultra violate'" is used in an exposure step. In FIG. 3I, after the molding step and linear ultra violate exposure step, photopolymer material 56 is hardened to form a polymer wall 56'" with alignment. In FIG. 3J, cavities generated between polymer walls 56'" are filled with mixture 58 of liquid crystal and small amount of photopolymer by a dipping device 80. Accordingly, the second substrate 560 is formed.

FIG. 3K to FIG. 3N illustrate process steps for coupling the first substrate 530 and the second substrate 560. In the FIG. 3K, the first substrate 530 is position reversely on top of the second substrate 560. In FIG. 3L, the first substrate 530 is exposed under the mask 57 radiating ultra violate 5". In FIG. 3M, after exposure step of ultra violate 5", a phase separation occurs between liquid crystal and photopolymer material of the mixture 58. The photopolymer material is hardened and polymerized for coupling the first substrate 530 and the second substrate 560. A polymer wall 56"" is formed from the polymer wall 56'" in the FIG. 3L and part of the polymer wall 56'" coupled to the substrate 54. At the same time, the polymer is completely wrapped by the liquid crystal material 59. In FIG. 3N, the support substrate 50 and the buffer layer 51 are detached from the first substrate 530. Accordingly, a single substrate liquid crystal display in the second embodiment is completed. The difference between the first and the second embodiments is that; the first embodiment utilizes the mask exposure, whereas the second embodiment utilizes a molding method, which results in a more flexible manufacturing process, less polymer doping and better quality of liquid crystal.

FIG. 4A to FIG. 4K are schematic diagrams illustrating manufacturing process of a liquid crystal display device in the third embodiment according to the present invention. The process steps of the third embodiment are largely identical with the steps of the first embodiment. The major difference lies in the fact that electrodes are disposed in the first substrate, projections are disposed on the first and second substrates, and photopolymer material mixture is composed if photopolymer material, liquid crystal and spacers for providing a improved quality of manufacturing process of liquid crystal display. The manufacturing process comprises steps described as follows.

Figure 4A:
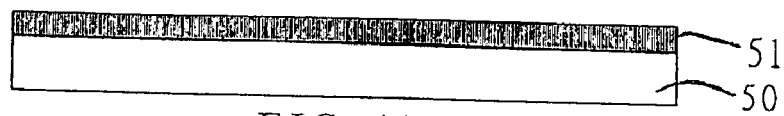
FIG. 4A to FIG. 4K are schematic diagrams illustrating manufacturing process of a single substrate liquid crystal display device in the third embodiment according to the present invention.
Figure 4B:
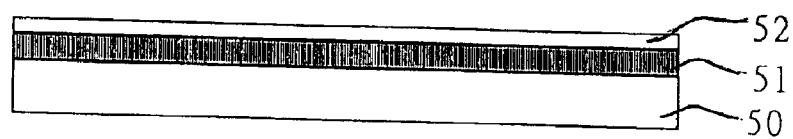
Figure 4C:
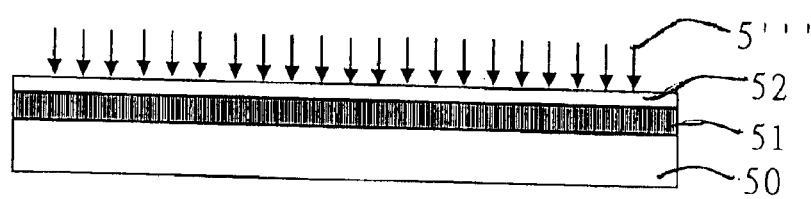
Figure 4D:
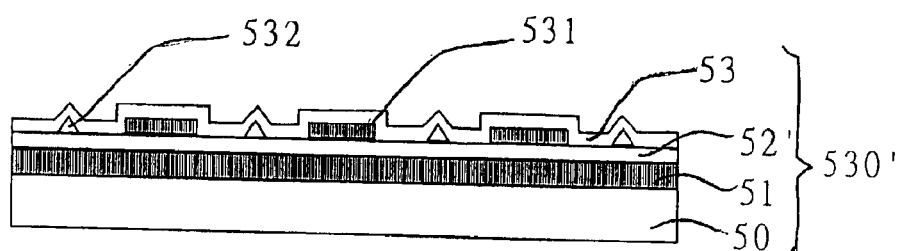

FIG. 4A to FIG. 4D illustrate process steps for forming a first substrate 530'. In FIG. 4A, a buffer layer 51 is formed on a support substrate 50. In FIG. 4B, a photopolymer material layer 52 (such as photopolymer material NOA 65 or NOA 72) is coated on the buffer layer 51. In FIG. 4C, the photopolymer material layer 52 is exposed under ultra violate 5 and hardened to form a photopolymer material layer 52'. In FIG. 4D, electrodes 531 and projections 532 are formed on the polymer layer 52'. Further, an alignment layer 53 is formed on the photopolymer material layer 52'. Accordingly, a first substrate 530' is completed.

Figure 4E:
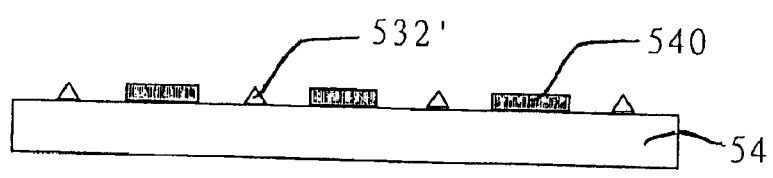
Figure 4F:
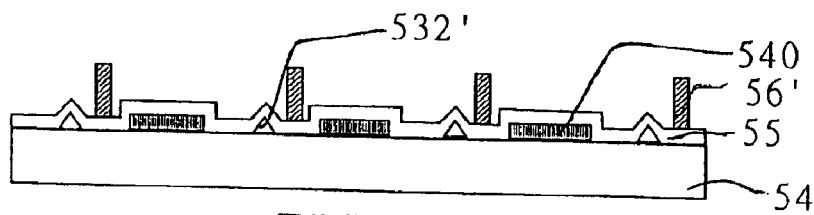
Figure 4G:
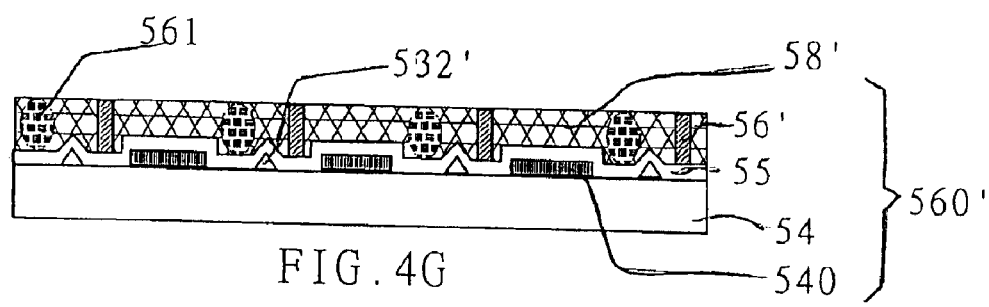
Figure 4H:
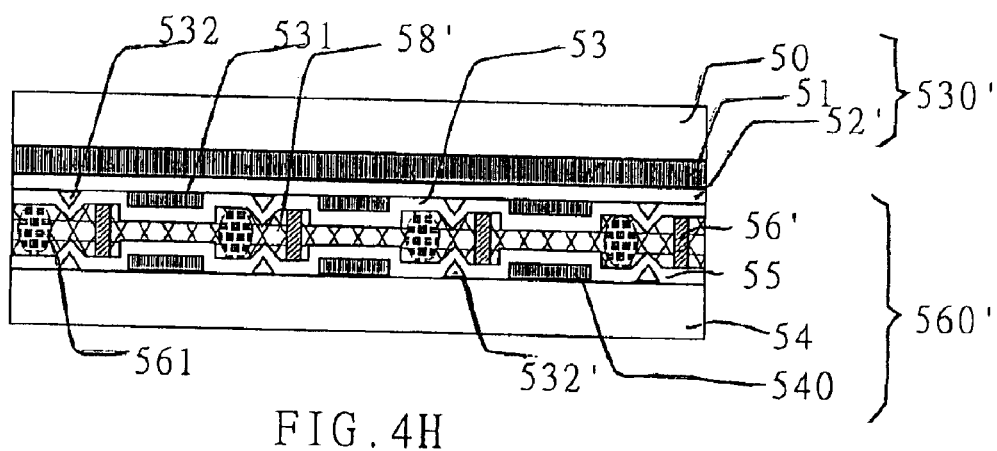

FIG. 4E to FIG. 4G illustrate process steps for forming a second substrate 560'. In FIG. 4E, electrode pattern 540 and projections 532" are formed on a substrate 54. In FIG. 4F, an alignment layer 55 is coated on the substrate 54, the electrode pattern 540 and projections 532". Further, a photopolymer material layer 56 is coated on the alignment layer 55. In the third embodiment of the present invention, as shown in the FIG. 4F, the polymer wall 56' is formed from hardening the photopolymer material layer 56 by mask exposure. On the other hand, the polymer wall formation in the third embodiment of present invention can also be completed by the molding method adapted in the second embodiment. In other words, the photopolymer material layer 56 is directly coated on the substrate 54, the electrode pattern 540 and projections 532'. Then the process moves to a molding step and linear ultra violate exposure step for hardening photopolymer material 56 and forming the polymer wall with alignment as required (not shown in the diagram). In FIG. 4G, cavities generated between the alignment layer 55 and the polymer wall 56', where cavities can either be formed by mask exposure or aforementioned molding method, are filled with mixture 58 of liquid crystal and small amount of photopolymer. At the same time, spacers 561 are disposed. Accordingly, the second substrate 560' is formed.

Figure 4I:
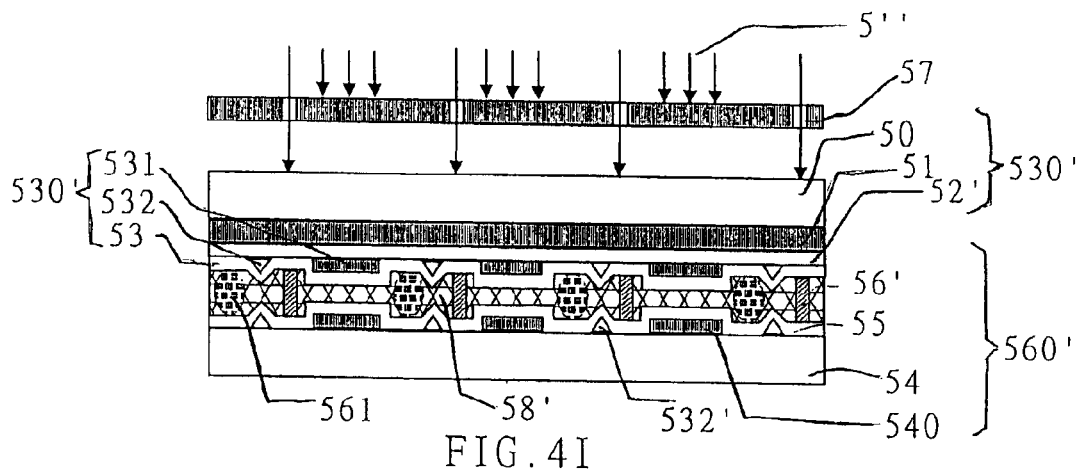
Figure 4J:
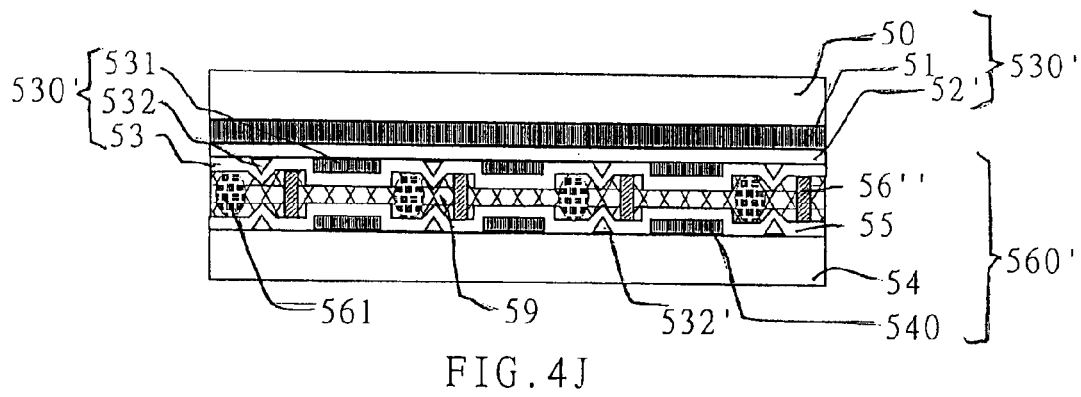
Figure 4K:
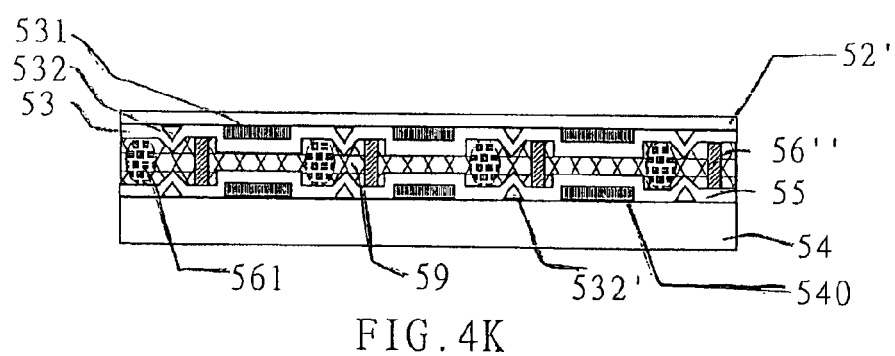

FIG. 4H to FIG. 4K illustrate process steps for coupling the first substrate 530' and the second substrate 560'. In the FIG. 4H, the first substrate 530' is position reversely on top of the second substrate 560'. In FIG. 4I, the first substrate 530' is exposed under the mask 57 radiating ultra violate 5". In FIG. 4J, after exposure step of ultra violate 5", a phase separation occurs between liquid crystal and photopolymer material of the mixture 58', wherein the photopolymer material is hardened and polymerized to form liquid crystal 59, and coupling the first substrate 530' and the second substrate 560'. At the same time, the polymer is completely wrapped by the liquid crystal material 59. In FIG. 4K, the support substrate 50 and the buffer layer 51 are detached from the first substrate 530'. Accordingly, a single substrate and dual side electrode liquid crystal display device is completed, wherein spacers 561 are disposed for effectively control the thickness of the liquid crystal layer, and the projections are disposed for effectively control the liquid crystal alignment modes. By employing such a method, different from the first and the second embodiments, viewing angle is improved also response rate of liquid crystal is increased.

FIG. 5A to FIG. 5K are schematic diagrams illustrating manufacturing process of a liquid crystal display device in the fourth embodiment according to the present invention. The manufacturing process is largely identical with the manufacturing process used in the third embodiment. The major difference lies in the fact that there are not any spacer disposed in the second substrate. However, the thickness of the liquid crystal layer is effectively controlled. The photopolymer material mixture is composed of photopolymer material and liquid crystal.

Figure 5A:
FIG. 5A to FIG. 5K are schematic diagrams illustrating manufacturing process of a single substrate liquid crystal display device in the fourth embodiment according to the present invention.
Figure 5B:
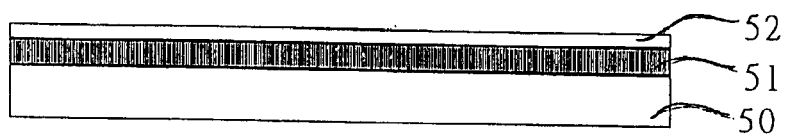
Figure 5C:
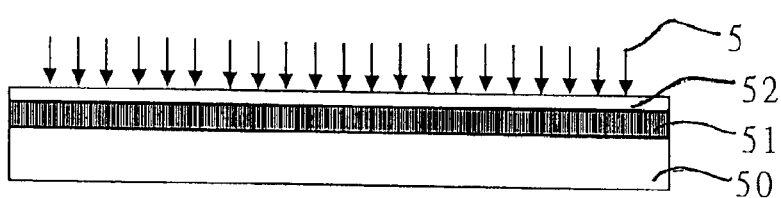
Figure 5D:
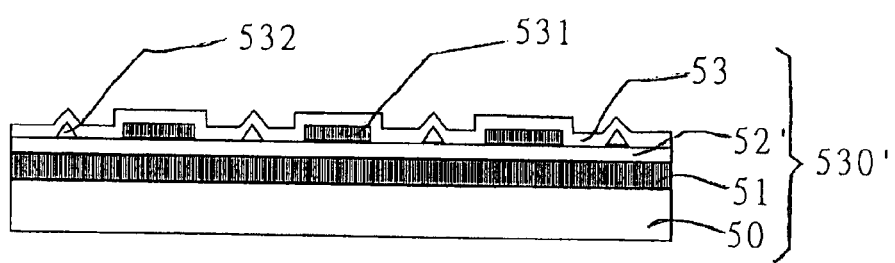

FIG. 5A to FIG. 5D illustrate process steps for forming a first substrate 530'. In FIG. 5A, a buffer layer 51 is formed on a support substrate 50. In FIG. 5B, a photopolymer material layer 52 (such as photopolymer material NOA 65 or NOA 72) is coated on the buffer layer 51. In FIG. 5C, the photopolymer material layer 52 is exposed under ultra violate 5 and hardened to form a photopolymer material layer 52'. In FIG. 5D, electrodes 531 and projections 532 are formed on the polymer layer 52'. Further, an alignment layer 53 is formed on the photopolymer material layer 52'. Accordingly, a first substrate 530' is completed.

Figure 5E:
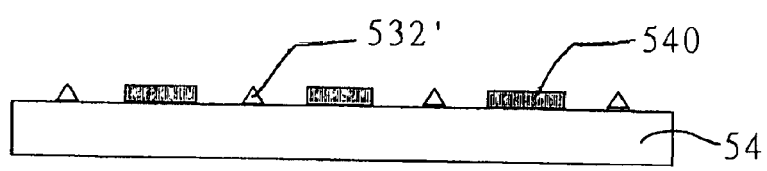
Figure 5F:
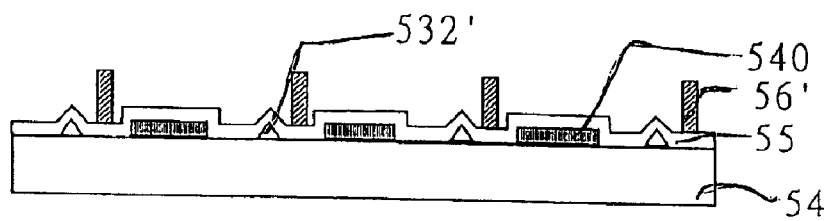
Figure 5G:
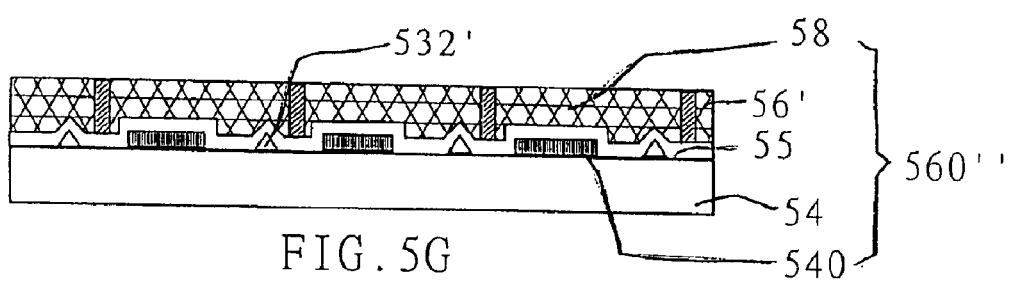
Figure 5H:
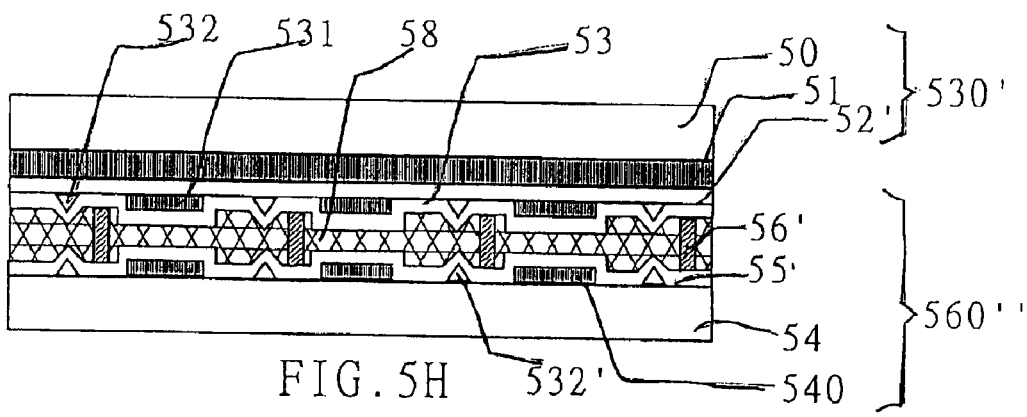

FIG. 5E to FIG. 5G illustrate process steps for forming a second substrate 560". In FIG. 5E, electrode pattern 540 and projections 532" are formed on a substrate 54. In FIG. 5F, an alignment layer 55 is coated on the substrate 54, the electrode pattern 540 and projections 532". Further, a photopolymer material layer 56 is coated on the alignment layer 55. In the fourth embodiment of the present invention, as shown in the FIG. 5F, the polymer wall 56' is formed from hardening the photopolymer material layer 56 by mask exposure. On the other hand, the polymer wall formation in the fourth embodiment of present invention can also be completed by the molding method adapted in the second embodiment. In other words, the photopolymer material layer 56 is directly coated on the substrate 54, the electrode pattern 540 and projections 532'. Then the process moves to a molding step and linear ultra violate exposure step for hardening photopolymer material 56 and forming the polymer wall with alignment as required (not shown in the diagram). In FIG. 5G, cavities generated between the alignment layer 55 and the polymer wall 56', where cavities can either be formed by mask exposure or aforementioned molding method, are filled with mixture 58 of liquid crystal and small amount of photopolymer. Accordingly, the second substrate 560" is formed.

Figure 5I:
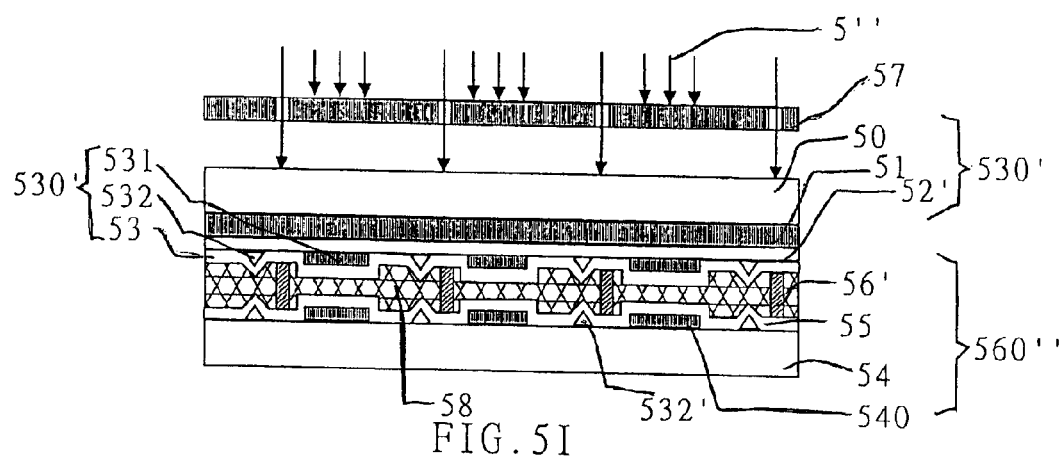
Figure 5J:
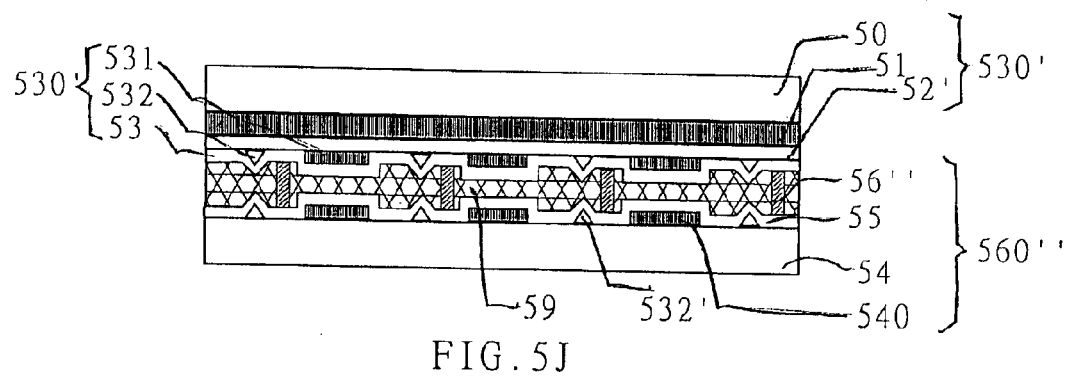
Figure 5K:
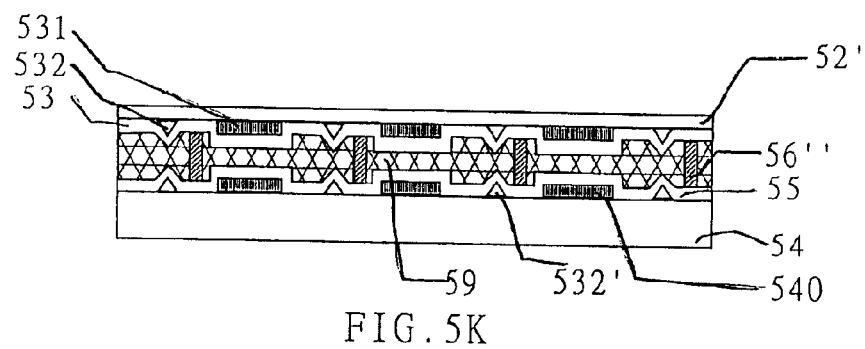

FIG. 5H to FIG. 5K illustrate process steps for coupling the first substrate 530' and the second substrate 560". In the FIG. 5H, the first substrate 530' is position reversely on top of the second substrate 560". In FIG. 5I, the first substrate 530' is exposed under the mask 57 radiating ultra violate 5". In FIG. 5J, after exposure step of ultra violate 5", a phase separation occurs between liquid crystal and photopolymer material of the mixture 58, wherein the photopolymer material is hardened and polymerized to form liquid crystal 59, and coupling the first substrate 530' and the second substrate 560". At the same time, the polymer is completely wrapped by the liquid crystal material 59. In FIG. 5K, the support substrate 50 and the buffer layer 51 are detached from the first substrate 530'. Accordingly, a single substrate and dual side electrode liquid crystal display in the fourth embodiment is completed. The part different from the third embodiment shown in the FIG. 4 is that there are not any spacer disposed in the second substrate 560". In other words, the photopolymer material mixture is only composed of photopolymer material and liquid crystal and the composition does not include spacers. When implementing the fourth embodiment, an effective control over the thickness of liquid crystal layer is performed without disposing spacers.

Figure 6A:
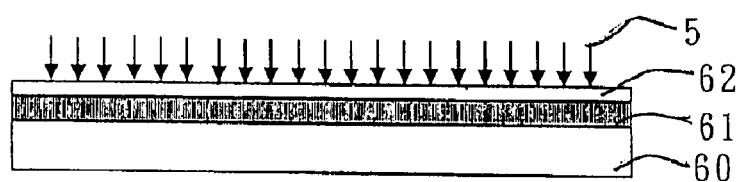
FIG. 6A to FIG. 6M are schematic diagrams illustrating manufacturing process of a liquid crystal display device without a substrate in the fifth embodiment according to the present invention.
Figure 6B:
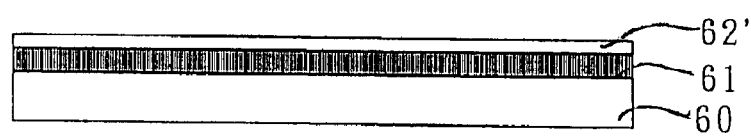
Figure 6C:
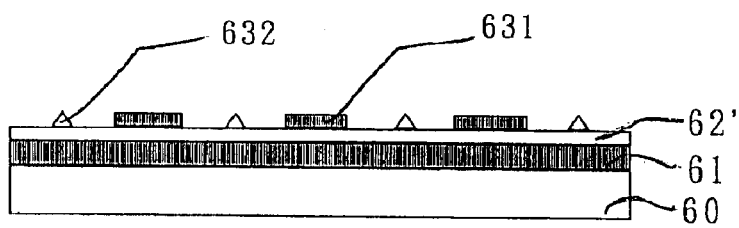
Figure 6D:
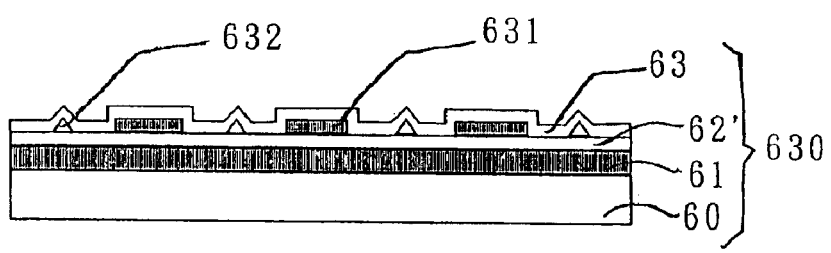

FIG. 6A to FIG. 6I are schematic diagrams illustrating manufacturing process of a liquid crystal display device in the fifth embodiment according to the present invention. The difference between the fifth embodiment and the third embodiment is that the fifth embodiment is implemented as a liquid crystal display device without a substrate. In FIG. 6A, a buffer layer 61 is formed on a first support substrate 60. The process then moves to a step of coating a photopolymer material layer 62 and a step of exposure radiation. In FIG. 6B, after the exposure of ultra violate 5 on the photopolymer material on the first support substrate 60, photopolymer material layer 62 is hardened to form polymer layer 62'. In FIG. 6C, electrodes 631 and projections 632 are formed on the polymer layer 62' of the first support substrate 60. In FIG. 6D, a alignment layer 63 is coated on the surface of the polymer layer 62' of the first support substrate 60, the electrodes 631 and the projections 632. Accordingly, the first substrate 630 is completed.

Figure 6E:
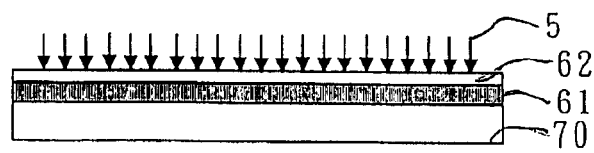
Figure 6F:
Figure 6G:
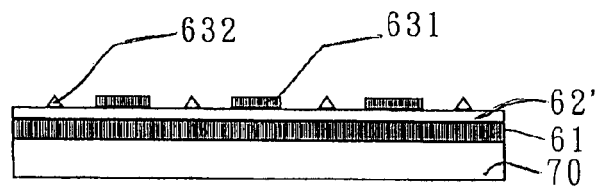
Figure 6H:
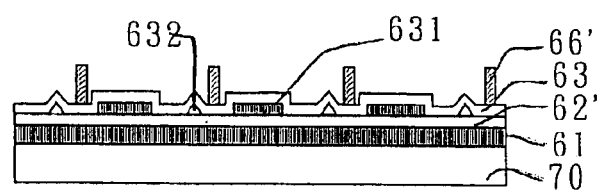
Figure 6I:
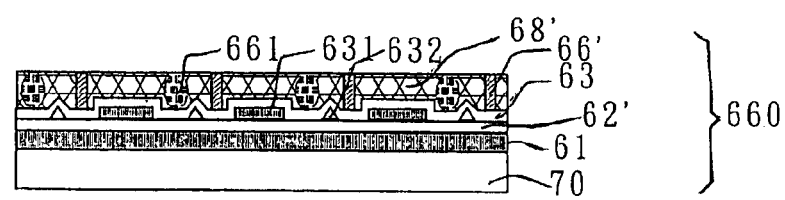

FIG. 6E illustrates the forming of the second substrate 660 in the fifth embodiment. A buffer layer 61 is formed on a second support substrate 70. The process then moves to a step of coating a photopolymer material layer 62 and a step of exposure radiation. In FIG. 6F, after the exposure of ultra violate 5 on the photopolymer material on the second support substrate 70, photopolymer material layer 62 is hardened to form polymer layer 62'. In FIG. 6G, electrodes 631 and projections 632 are formed on the polymer layer 62' of the second support substrate 70. In FIG. 6H, a alignment layer 63 is coated on the surface of the polymer layer 62' of the second support substrate 70, the electrodes 631 and the projections 632. At the same time, after an alignment layer 63 is coated on the polymer layer 62', the electrodes 631 and the projections 632 of the second support substrate 70. then a photopolymer material layer is coated on the substrate. Mask exposure is applied to the photopolymer material layer 66 to form a polymer wall 66'. A molding method for forming polymer wall can also be applied in the fifth embodiment of the present invention. A photopolymer material layer 66 is coated on the polymer layer 62', the electrodes 631 and the projections 632 of the second support substrate 70. Then the process moves to a molding step and linear ultra violate exposure step for hardening photopolymer material 66 and forming the polymer wall with alignment as required (not shown in the diagram). In FIG. 6I, cavities generated between the alignment layer 63 and the polymer wall 66', where cavities can either be formed by mask exposure or aforementioned molding method, are filled with mixture 68' of liquid crystal and small amount of photopolymer as well as spacers 661. Accordingly, the second substrate 660 is formed.

Figure 6J:
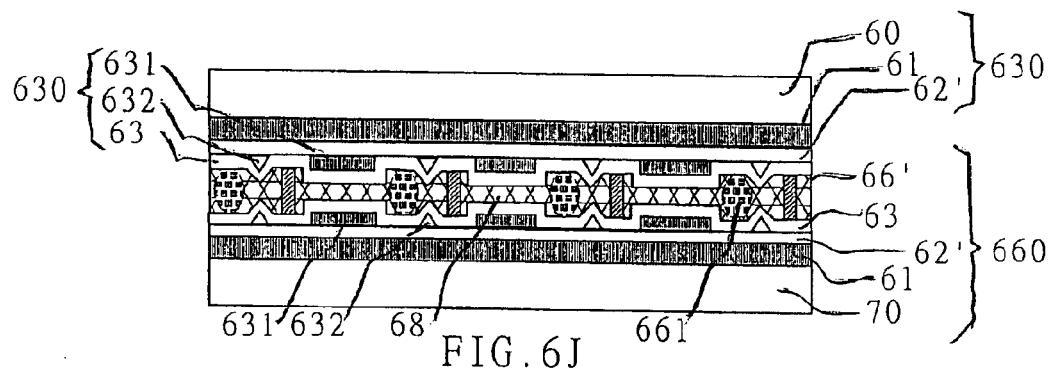
Figure 6K:
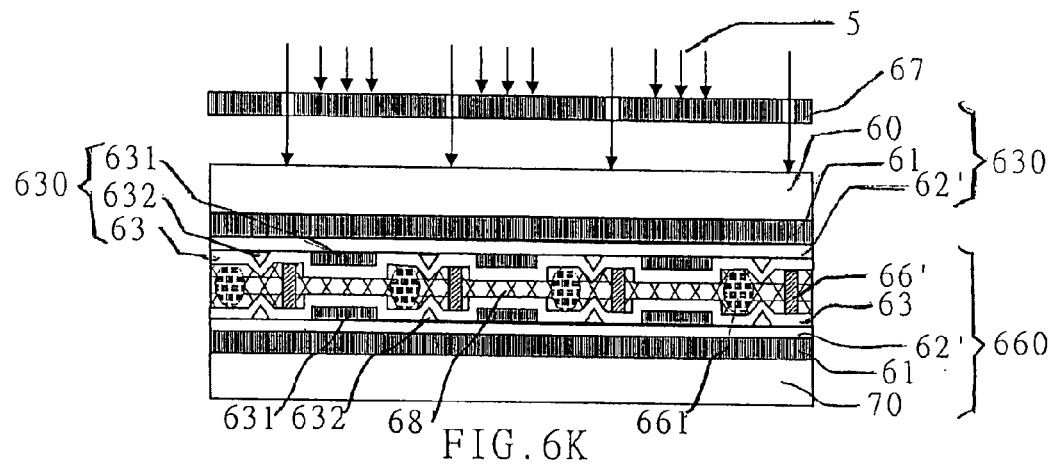
Figure 6L:
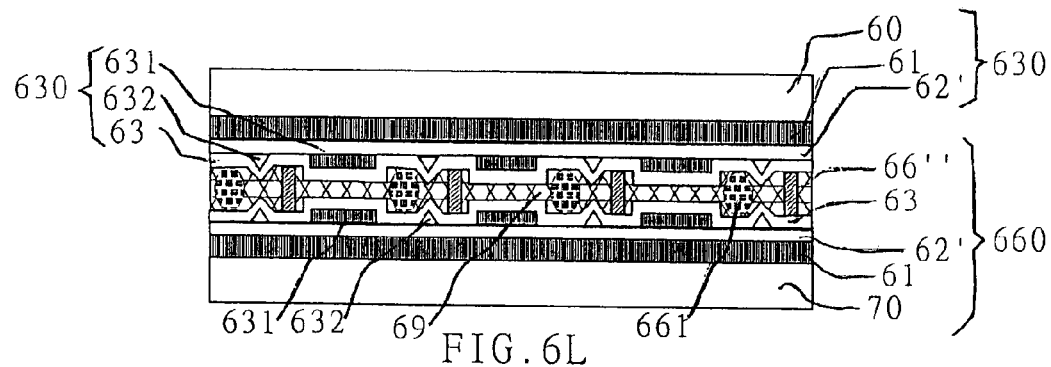
Figure 6M:
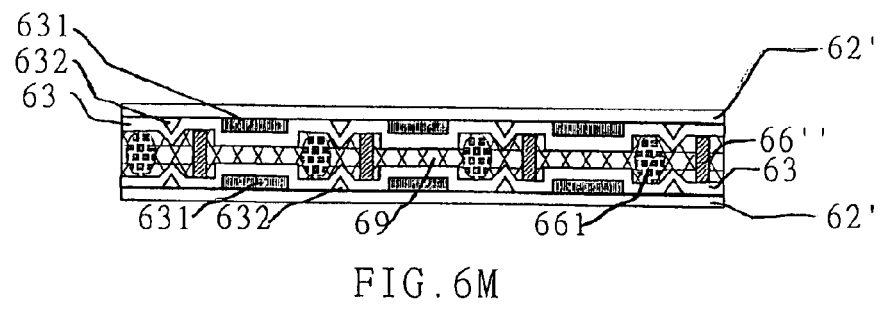

In FIG. 6J, after the first substrate 630 is positioned reversely on top of the second substrate 660, the process then moves to a exposure step. In FIG. 6K, an exposure process step is performed by a mask 67 radiating ultra violate 5. In FIG. 6L, a phase separation occurs to the photopolymer material mixture 68' after exposure step. The photopolymer material is hardened and polymerized, liquid crystal layer 69 is formed, and the first substrate 630 and the second substrate 660' are coupled. At the same time, the polymer is completely wrapped by the liquid crystal material 69. In FIG. 6M, the support substrate 60 and the buffer layer 61 are detached from the first substrate 630. The support substrate 70 and the buffer layer 61 are detached from the second substrate 660. Accordingly, a dual side electrode liquid crystal display device without a substrate having spacers for controlling thickness of a liquid crystal layer is completed. By implementing fifth embodiment of the present invention, a liquid crystal display device without a substrate is realized. The fifth embodiment of the present invention can be widely applied to the manufacturing process of liquid crystal display device. Without a substrate, the liquid crystal display device can be easily attached to an object, such as attached to clothes, news papers, wind shield glass of cars, walls, books, and file folders. Such liquid crystal display device can be attached flexibly.

FIG. 7A to FIG. 7I are schematic diagrams illustrating manufacturing process of a liquid crystal display device in the sixth embodiment according to the present invention. The sixth embodiment is also a manufacturing process of a liquid crystal display device without a substrate. The manufacturing process used is largely identical with the manufacturing process used in the fifth embodiment. The major difference lies in the fact that the photopolymer material mixture applied in the sixth embodiment does not include spacers.

Figure 7A:
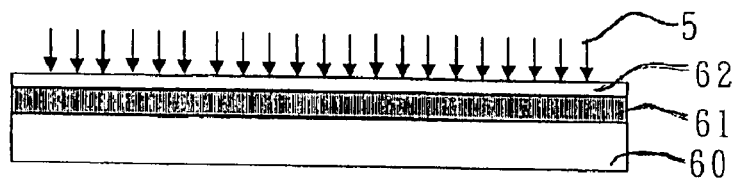
FIG. 7A to FIG. 7M are schematic diagrams illustrating manufacturing process of a liquid crystal display device without a substrate in the sixth embodiment according to the present invention.
Figure 7B:
Figure 7C:
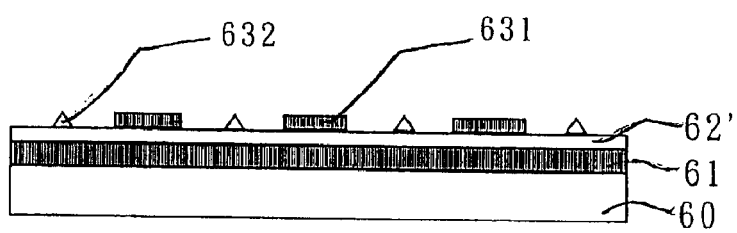
Figure 7D:
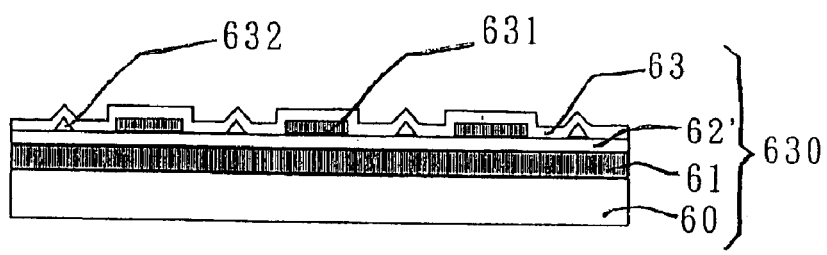

In FIG. 7A, a buffer layer 61 is formed on a first support substrate 60. The process then moves to a step of coating a photopolymer material layer 62 and a step of exposure radiating ultra violate 5. In FIG. 7B, after the exposure of ultra violate 5 on the photopolymer material on the first support substrate 60, photopolymer material layer 62 is hardened to form polymer layer 62'. In FIG. 7C, electrodes 631 and projections 632 are formed on the polymer layer 62' of the first support substrate 60. In FIG. 7D, after an alignment layer 63 is coated on the polymer layer 62', the electrodes 631 and the projections 632 of the first support substrate 60. Accordingly, a first substrate 630 is completed.

Figure 7E:
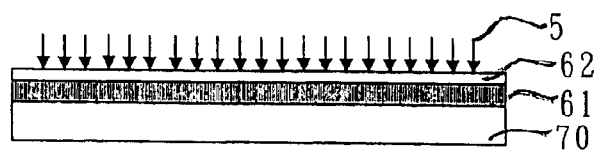
Figure 7F:
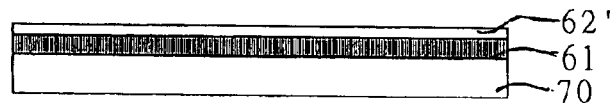
Figure 7G:
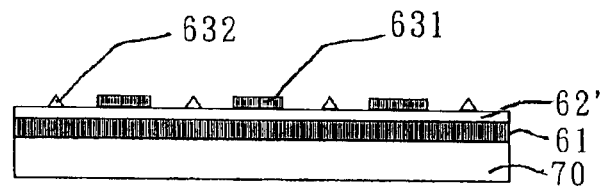
Figure 7H:
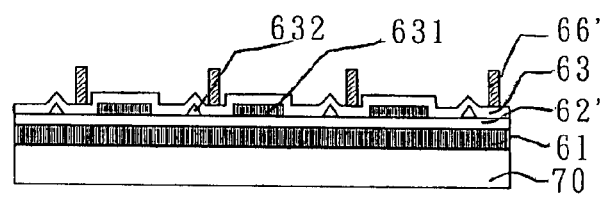

In FIG. 7E, a step of forming a second substrate 660' is illustrated. A buffer layer 61 is formed on a second support substrate 70. The process then moves to a step of coating a photopolymer material layer 62 and a step of exposure radiating ultra violate 5. In FIG. 7F, after the exposure of ultra violate 5 on the photopolymer material on the second support substrate 70, photopolymer material layer 62 is hardened to form polymer layer 62'. In FIG. 7G, electrodes 631 and projections 632 are formed on the polymer layer 62' of the second support substrate 70. In FIG. 7H, an alignment layer 63 is coated on the polymer layer 62', the electrodes 631 and the projections 632 of the second support substrate 70, then a photopolymer material layer 66 is coated on the substrate. Mask exposure is applied to the photopolymer material layer 66 to form a polymer wall 66'. On the other hand, alternatively, the polymer wall in the sixth embodiment can be formed by molding method. A photopolymer material layer 66 is coated on the polymer layer 62', the electrodes 631 and the projections 632 of the second support substrate 70. Then the process moves to a molding step and linear ultra violate exposure step for hardening photopolymer material 66 and forming the polymer wall with alignment as required by a mold (not shown in the diagram).

Figure 7I:
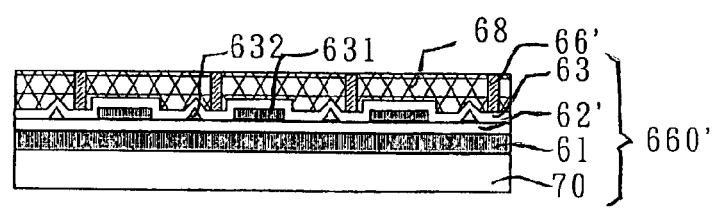

In FIG. 7I, cavities generated between the alignment layer 63 of the second support substrate 70 and the polymer wall 66', where cavities can either be formed by mask exposure or aforementioned molding method, are filled with mixture 68 of liquid crystal and small amount of photopolymer. Accordingly, the second substrate 660 is formed without disposing of spacers.

Figure 7J:
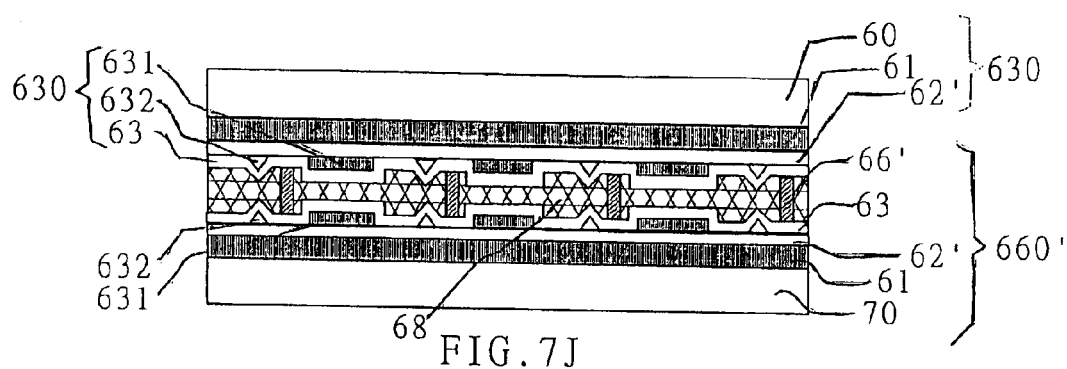
Figure 7K:
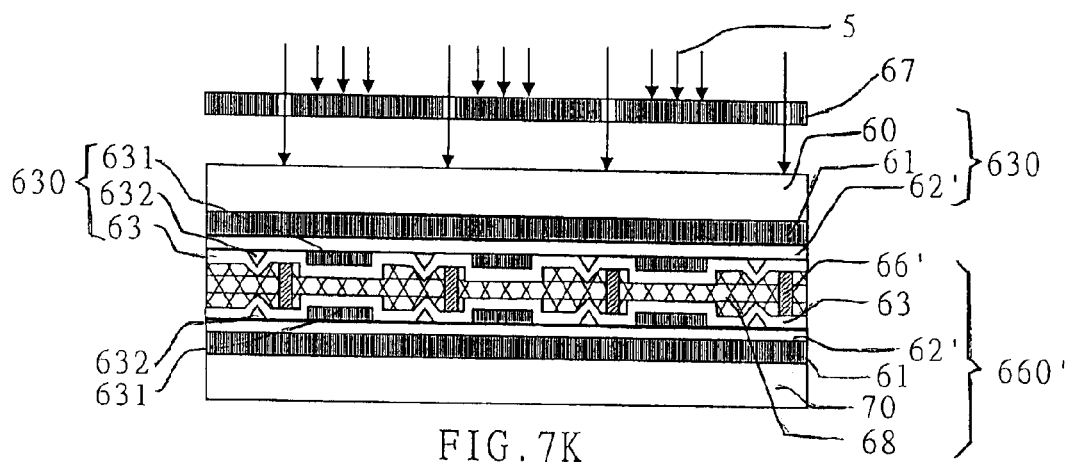
Figure 7L:
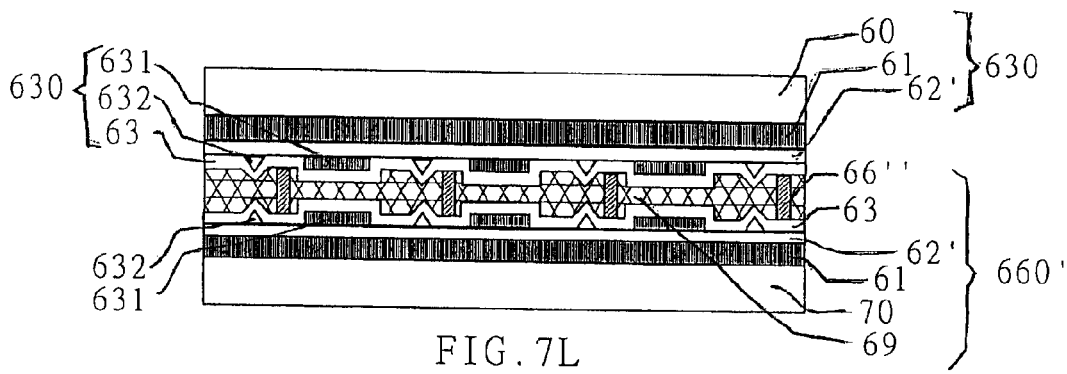
Figure 7M:
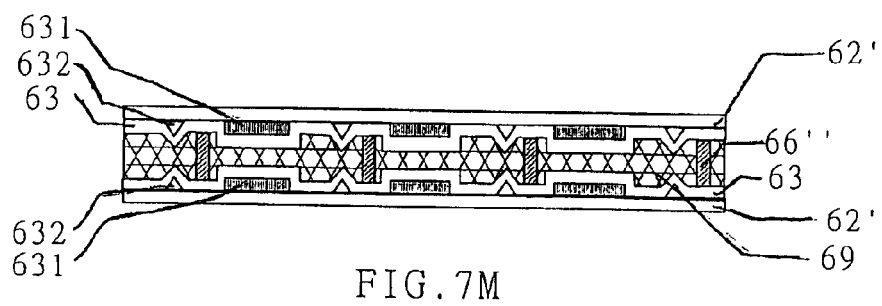

In the FIG. 7J, the first substrate and the second substrate are coupled. Firstly, the first substrate 630 is positioned reversely on top of the second substrate 660', the process then moves to an exposure step. In FIG. 7K, an exposure process step is performed by a mask 67 radiating ultra violate 5. In FIG. 7L, an phase separation occurs to the photopolymer material mixture 68 after exposure step. The photopolymer material is hardened and polymerized, liquid crystal layer 69 is formed, and the first substrate 630 and the second substrate 660' are coupled. At the same time, the polymer is completely wrapped by the liquid crystal material 69. In FIG. 7M, the support substrate 60 and the buffer layer 61 are detached from the first substrate 630. The support substrate 70 and the buffer layer 61 are detached from the second substrate 660'. Accordingly, a single substrate and dual side electrode liquid crystal display is completed without disposing spacers and substrate. Without a substrate, the liquid crystal display device can be easily attached to an object, such as attached to clothes, news papers, wind shield glass of cars, walls, books, and file folders. Such liquid crystal display device can be attached flexibly. In the embodiments described above, the photopolymer material can be photocurable resin. The polymer wall formed by photopolymer material is a closed matrix polymer wall or a non-closed matrix polymer wall. Further more, the material of the support substrate and the substrate of the second substrate can be glass, chipsets, teflon or plastic. The material of the electrode pattern of the first or the second substrate is conducting film made of ITO or PEDOT (polyethylene-dioxithiophene). The material of the buffer layer can be PE/PEWax, long chain aliphatics, silicone, or teflon. The alignment layer manufacturing process step is performed by rubbing alignment, photo alignment, ion beam alignment or micro texture structure alignment. The micro texture structure alignment is performed by molding a special designed mold pattern, so as to form the polymer wall and the micro texture structure alignment. The alignment material used in the aforementioned alignment manufacturing process step can be polyimide, polyamic acid or a photo alignment material.

On the other hand, projections mentioned from the third to the sixth embodiments are made of organic materials, which increase the range of viewing angle, wherein the projections are formed by molding a special designed mold pattern, so as to generate a wide viewing angle of multi domain and increase the viewing quality of the liquid crystal display device.

Further more, the liquid crystal used in the embodiments above can be nematic, cholesteric, ferroelectric, or anti-ferroelectric liquid crystal. The dopant used in the liquid crystal material includes be dye, chiral molecule and monomer. By utilizing the liquid crystal materials and dopant used as mentioned above, resulting display modes comprise transmissive mode, reflective mode, and half-transmissive half reflective mode. The operation modes include in plane switching mode and non coplanar switching mode. All embodiments mentioned above utilized a roll to roll manufacturing process. The count of electrodes and projections can be an even number or an odd number.

A detailed description of the manufacturing process for a liquid crystal display device according to the present invention is disclosed above. The manufacturing process according to the present invention can resolve the problems occurred to the prior art technology proposed by KONINKL PHILIPS ELECTRONICS NV such as the second exposure involving with a step using low energy and long process time, possible deterioration of liquid crystal, small manufacturing window, low yield rate, and limited display modes applicable. In other words, the present invention provide a manufacturing process not only increases yield rate, diversified display modes, improved method for wrapping liquid crystal molecules and a improved control over the thickness of a liquid crystal layer.

Although the invention is illustrated and described herein with reference to particular embodiments, the invention is not intended to be limited to the details shown. Rather, various modifications may be made in the details within the scope and range of equivalents of the claims and without departing from the spirit of the invention.

What is claimed is:

1. A method for manufacturing liquid crystal display device comprising:

forming a first substrate by coating a photopolymer material layer on a support substrate having a buffer layer and having the support substrate exposed under ultra violate and hardened, then coating a alignment layer on the exposed and hardened photopolymer material layer;

forming a second substrate having a plurality of polymer walls by coating a alignment layer on a substrate having electrode patterns, then coating a photopolymer material layer on the substrate, having the substrate exposed by masking and hardened, generating a plurality of cavities between a plurality of polymer walls, and injecting a mixture of liquid crystal and small amount of photopolymer; and coupling the first substrate and the second substrate by having the support substrate of the first substrate aligned with the substrate of the second substrate aligned, performing a mask exposure for coupling the support substrate to the substrate via photopolymerization, completing the phase separation between the liquid crystal and the photopolymer material, wrapping the liquid crystal materials with the photopolymer material, then separating the support substrate from the substrate.

2. The method for manufacturing liquid crystal display device of claim 1, wherein alternatively a plurality of polymer walls are formed by coating a photopolymer material layer on the substrate on the substrate having electrode patterns, the substrate is molded and exposed under linear ultra violate, then the photopolymer material layer are hardened and forms a polymer wall with alignment.

3. The method for manufacturing liquid crystal display device of claim 1, wherein the photopolymer material is photocurable resin.

4. The method for manufacturing liquid crystal display device of claim 1, wherein the materials of support substrate or substrate is glass, chipsets, teflon or plastic.

5. The method for manufacturing liquid crystal display device of claim 2, the material of the electrode patterns is a conducting film.

6. The method for manufacturing liquid crystal display device of claim 5, wherein the material of the conducting film is ITO or PEDOT (polyethylene-dioxithiophene).

7. The method for manufacturing liquid crystal display device of claim 1, wherein the material of the buffer layer is PE/PEWax, long chain aliphatics, silicone, or teflon.

8. The method for manufacturing liquid crystal display device of claim 1, wherein the step of forming the first substrate further comprises a sub step of forming a electrode patterns on the support substrate of the first substrate.

9. The method for manufacturing liquid crystal display device of claim 1, the alignment layer is formed by coating an alignment layer with rubbing alignment, photo alignment, ion beam alignment or micro texture structure alignment.

10. The method for manufacturing liquid crystal display device of claim 9, wherein the micro texture structure alignment is performed by molding a special designed mold pattern, so as to form the polymer wall and the micro texture structure alignment.

11. The method for manufacturing liquid crystal display device of claim 9, wherein the alignment material is polyimide, polyamic acid or a photo alignment material.

12. The method for manufacturing liquid crystal display device of claim 1, wherein the step of forming the first and second substrates further comprises a sub step of forming projections so as to allow the liquid crystal display device having a wide viewing angle.

13. The method for manufacturing liquid crystal display device of claim 12, wherein the projections are formed by molding a special designed mold pattern, so as to generate a wide viewing angle of multi domain.

14. The method for manufacturing liquid crystal display device of claim 1, wherein the polymer wall formed by photopolymer material is a closed matrix polymer wall.

15. The method for manufacturing liquid crystal display device of claim 1, wherein the polymer wall formed by photopolymer material is a non-closed matrix polymer wall.

16. The method for manufacturing liquid crystal display device of claim 1, wherein the mixture of photopolymer material is composed of a photopolymer material and a liquid crystal material.

17. The method for manufacturing liquid crystal display device of claim 1, wherein the mixture of photopolymer material further comprises spacers.

18. A method for manufacturing liquid crystal display device comprising:

forming a first substrate by coating a photopolymer material layer on a support substrate having a buffer layer and having the support substrate exposed under ultra violate and hardened, coating a electrode pattern on the exposed and hardened photopolymer material layer, then coating an alignment layer on the support substrate;

forming a second substrate having a plurality of polymer walls by coating a alignment layer on a substrate having electrode patterns, then coating a photopolymer material layer on the substrate, having the substrate exposed by masking and hardened, generating a plurality of cavities between a plurality of polymer walls, and injecting a mixture of liquid crystal and small amount of photopolymer; and coupling the first substrate and the second substrate by having the support substrate of the first substrate aligned with the substrate of the second substrate aligned, performing a mask exposure for coupling the support substrate to the substrate via photopolymerization, completing the phase separation between the liquid crystal and the photopolymer material, wrapping the liquid crystal materials with the photopolymer material, separating the support substrate of the first substrate from the substrate of the second substrate, then forming a liquid crystal display device without a substrate.

19. The method for manufacturing liquid crystal display device of claim 18, wherein the photopolymer material is photocurable resin.

20. The method for manufacturing liquid crystal display device of claim 18, wherein the materials of the support substrate or the substrate is glass, chipsets, teflon or plastic.

21. The method for manufacturing liquid crystal display device of claim 18, the material of the electrode patterns is a conducting film.

22. The method for manufacturing liquid crystal display device of claim 21, wherein the material of the conducting film is ITO or PEDOT (polyethylene-dioxithiophene).

23. The method for manufacturing liquid crystal display device of claim 18, wherein the material of the buffer layer is PE/PEWax, long chain aliphatics, silicone, or teflon.

24. The method for manufacturing liquid crystal display device of claim 18, the alignment layer is formed by coating an alignment layer with rubbing alignment, photo alignment, ion beam alignment or micro texture structure alignment.

25. The method for manufacturing liquid crystal display device of claim 24, wherein the micro texture structure alignment is performed by molding a special designed mold pattern, so as to form the polymer wall and the micro texture structure alignment.

26. The method for manufacturing liquid crystal display device of claim 24, wherein the alignment material is polyimide, polyamic acid or a photo alignment material.

27. The method for manufacturing liquid crystal display device of claim 18, wherein the step of forming the first and second substrates further comprises a sub step of forming projections so as to allow the liquid crystal display device having a wide viewing angle.

28. The method for manufacturing liquid crystal display device of claim 27, wherein the projections are formed by molding a special designed mold pattern, so as to generate a wide viewing angle of multi domain.

29. The method for manufacturing liquid crystal display device of claim 18, wherein the polymer wall formed by photopolymer material is a closed matrix polymer wall.

30. The method for manufacturing liquid crystal display device of claim 18, wherein the polymer wall formed by photopolymer material is a non-closed matrix polymer wall.

31. The method for manufacturing liquid crystal display device of claim 18, wherein the mixture of photopolymer material is composed of a photopolymer material and a liquid crystal material.

32. The method for manufacturing liquid crystal display device of claim 18, wherein the mixture of photopolymer material further comprises spacers.

33. The method for manufacturing liquid crystal display device of claim 18, wherein alternatively a plurality of polymer walls are formed by coating a photopolymer material layer on the substrate on the substrate having electrode patterns, the substrate is molded and exposed under linear ultra violate, then the photopolymer material layer are hardened and forms a polymer wall with alignment.

\* \* \* \* \*